United States Patent [19]

Iwata et al.

[11] 4,423,941
[45] Jan. 3, 1984

[54] DEVICE FOR SHIFTING LENS GROUP

[75] Inventors: Hiroshi Iwata, Nara; Tsunemi Yoshino, Ibaraki, both of Japan

[73] Assignee: West Electric Co., Ltd., Osaka, Japan

[21] Appl. No.: 267,686

[22] Filed: May 28, 1981

[30] Foreign Application Priority Data

Jun. 10, 1980 [JP] Japan .................................. 55-78618

[51] Int. Cl.³ .......................... G03B 3/10; Go2B 7/11
[52] U.S. Cl. .................................... 354/195; 350/255; 350/400
[58] Field of Search ................. 354/25 R, 25 A, 25 P, 354/25 N, 195–198; 352/140; 355/56; 350/255, 257

[56] References Cited

U.S. PATENT DOCUMENTS 4,083,057 4/1978 Quinn ............................. 354/195 X
4,291,958 9/1981 Frank et al. ..................... 354/195 X
4,303,324 12/1981 Marcus ............................... 354/195

Primary Examiner—William B. Perkey

Attorney, Agent, or Firm—Burgess, Ryan & Wayne

[57] ABSTRACT

A lens shifting device comprising a stationary cylinder having a mounting means adapted to engage with a mating means of a main body of an equipment which uses an optical lens assembly which must be shifted for focusing, an inner cylinder which is slidably fitted into the stationary cylinder and in which is securely mounted a lens group, contact members is slidable contact with the inner cylindrical surface of the stationary cylinder, one of which is interconnected with the inner cylinder coaxially, locking means adapted to cause the contact members to lock to said stationary cylinder, and expandable-and-collapsible means interconnecting between the contact members. The inner cylinder is caused to slide step by step relative to the stationary cylinder in the axial direction thereof and forward or backward by activating the locking means and the expandable-and-collapsible means by desired timing relationship. The device is very simple in construction, but highly reliable and dependable in operation.

11 Claims, 6 Drawing Figures

DEVICE FOR SHIFTING LENS GROUP

BACKGROUND OF THE INVENTION

The present invention relates to a device for shifting a lens group in an optical lens assembly for cameras or the like.

It is well known in the art that in some optical or photographic lenses, some or all the elements in a lens group must be shifted depending upon the distance to an object so as to sharply focus it. To this end, there have been proposed various types of devices for shifting a lens group manually or electrically.

Motor-driven lens shifting devices employ various types of motors such as stepping motors, linear motors and so on. In general, a motor is mounted in a photographic or optical lens assembly so that the assembly becomes large in size and heavy in weight and subsequently is not portable. In addition, malfunctions tend to occur very frequently due to shocks or impacts. Therefore, the conventional lens shifting devices are not reliable and dependable in operation.

SUMMARY OF THE INVENTION

The present invention was made to solve the above and other problems encountered in the prior art lens shifting devices. One of the objects of the present invention is, therefore, to provide a lens shifting device in which piezoelectric or electrostrictive transducers which produce mechanical distortions when applied with a voltage are used as driving means and energized and de-energized in a proper timed sequence so that an inner barrel in which is mounted a lens group is shifted forwardly or backwardly in the axial direction of a stationary outer barrel and locked at a position at which an object is sharply focused.

Since the present invention employs piezoelectric or electrostrictive transducers which, when applied with electrical signals or voltages, distort in the direction of their thickness, a photographic or optical lens assembly can be made very simple in construction, compact in size and light in weight. In addition, no precision mechanism is needed, so that there may be provided a lens shifting device which is highly reliable and dependable in operation.

The above and other objects, effects and features of the present invention will become more apparent from the following description of embodiments thereof taken in conjunction with the accompanying drawings.

DESCRIPTION OF THE PREFERRED EMBODIMENTS

Figure 1A:
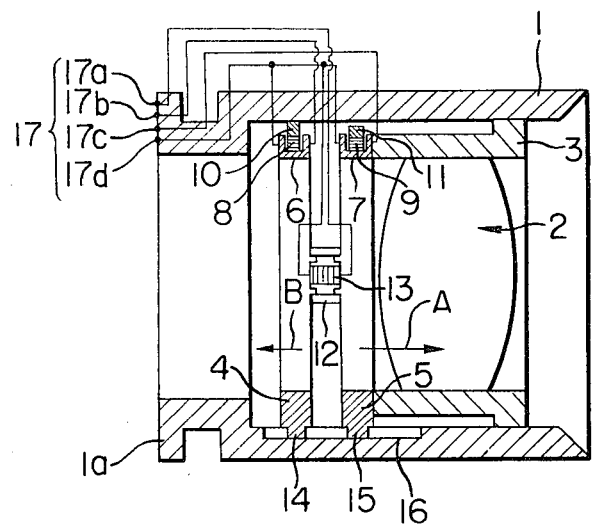
FIG. 1A is a sectional view of a first embodiment of the present invention.
Figure 1B:
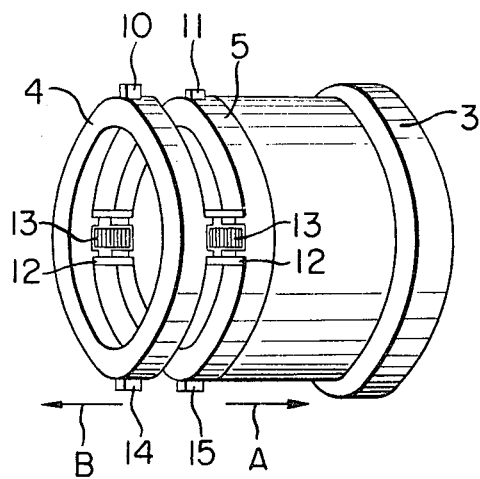
FIG. 1B is a perspective view of an inner barrel and first and second rings of the first embodiment.

Referring to FIGS. 1A and 1B, reference numeral 1 denotes a stationary cylinder with a mounting flange 1a which is adapted to engage with a mating lens mount of a main body of an equipment (not shown); 2, a lens group securely mounted in an inner cylinder 3; 4 and 5, first and second rings which are mounted on the inner cylinder 3 and are adapted to cause it to shift and stop; 6 and 7, first and second recesses formed in the outer cylindrical surfaces, respectively, of the first and second rings 4 and 5; 8 and 9, first and second piezoelectric transducers disposed in the first and second recesses 6 and 7, respectively; 10 and 11, first and second sliding members mounted on the first and second piezoelectric transducers 8 and 9, respectively; 12, an expandable-and-collapsible coupling (to be referred to as a "collapsible coupling" for brevity in this specification) which interconnects between the first and second rings 4 and 5 in such a way normally that they are attracted to each other and which has a third piezoelectric transducer 13; 14 and 15, first and second projections or guides extended radially outwardly from the outer cylindrical surfaces of the first and second rings 4 and 5, respectively, and slidably fitted into a straight guide groove 16 formed in the inner cylindrical surface of the stationary cylinder 1 in the axial direction thereof; and 17, a bank of contacts mounted on the stationary cylinder 1 for establishing the electrical connections with an external control circuit (not shown).

The piezoelectric transducers 8 and 9 may be piezoelectric ceramics of well known barium titanate or lead zircon-titanate which produce greater mechanical distortions. In order to further enhance the distortions, the piezoelectric transducers 8 and 9 comprise a lamination of a plurality of piezoelectric ceramic elements as will be described in detail below.

The second ring 5 is securely joined to the inner cylinder 3, so that when the second ring 5 is moved, the inner cylinder 3 and hence the lens group 2 are shifted. It is apparent that the first and second rings 4 and 5 move straightly in the axial direction of the stationary cylinder 1 because their projections 14 and 15 are slidably fitted into the guide groove 16 as described previously. It is possible to make the inner cylinder 3 and the second ring 5 into a unitary construction.

When a voltage is applied across the transducer 8 or 9, the latter is distorted, so that the sliding member 10 or 11 is caused to slide upwardly and engage with the inner cylindrical surface of the stationary cylinder 1, whereby the first or second ring 4 or 5 is held stationary relative to the stationary cylinder 1. Therefore, when the piezoelectric transducers 8, 9 and 13 are selectively energized, the shifts of the inner cylinder 3 in which is mounted the lens group 2 and the first and second rings 4 and 5 are controlled as will be described in detail below.

When the first piezoelectric transducer 8 on the first ring 4 is energized, the sliding member 10 rises to engage with the inner cylindrical surface of the stationary cylinder 1, whereby the first ring 4 is held stationary. When the third piezoelectric transducers 13 on the collapsible couplings 12 are energized, they are distorted in the direction of their thickness so that the second ring 5 and hence the inner cyliner 3 are caused to shift away from the first ring 4 as indicated by an arrow A.

When the second piezoelectric transducer 9 is energized while the first and third piezoelectric transducers 8 and 13 are de-energized, the sliding member 11 rises to engage with the inner cylindrical surface of the stationary cylinder 1, whereby the second ring 5 and hence the inner cylinder 3 are held stationary and the first ring 4 is disengaged from the stationary cylinder 1 and shifted toward the second ring 5 in the direction indicated by the arrow A under the forces of the collapsible couplings 12.

When the first, second and third transducers 8, 9 and 13 are energized, their distortions in the direction of their thickness are very small, but when the abovedescribed steps are repeated, the lens group 2 is shifted over a desired distance in the direction A so as to focus an object. It is apparent that when the third piezoelectric transducers 13 are de-energized after the lens group 2 has been shifted over a desired distance, the lens group 2 is held stationary. The direction and speed of the shift and the distance to be shifted are controlled in response to the electrical signals applied to the piezoelectric transducers 8, 9 and 13 via the electric contacts or terminals 17a to 17d. Any of various conventional focusing means may be used to generate these control signals.

Figure 2:
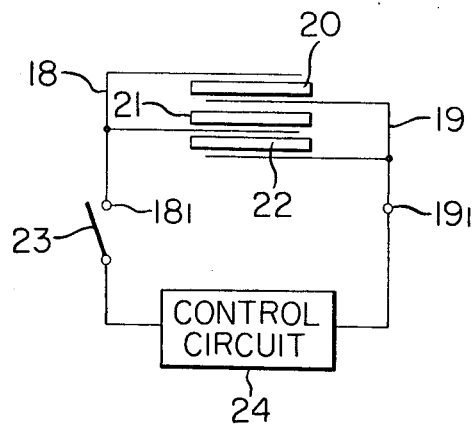
FIG. 2 is a schematic view of a piezoelectric transducer used in the present invention.

The first, second and third piezoelectric transducers 8, 9 and 13 are of the interdigital structure as shown in FIG. 2. Finger-like electrodes 18 and 19 and piezoelectric ceramic elements 20, 21 and 22 are arranged into an interdigital array so that the distortions of the piezoelectric transducer are enhanced. Terminals $18_1$ and $19_1$ of the electrodes 18 and 19 are connected to or extended to the terminal bank 17 shown in FIG. 1. A switch 23 which may be disposed in the optical lens assembly shown in FIGS. 1A and 1B or in the main body of the equipment (not shown) controls the application of the control signal from a control circuit 24 in the focusing means within the main body.

Figure 3:
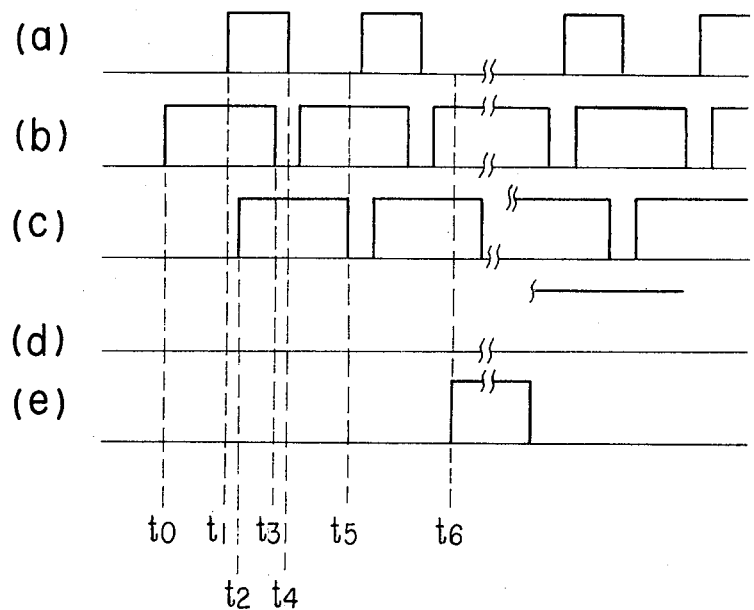
FIG. 3 is a timing diagram used for the explanation of the mode of operation of the first embodiment.

Referring next to FIG. 3, the mode of operation of the first embodiment will be described in more detail. The control signal (a) is applied via the terminal 17a to the third piezoelectric transducers 13; the control signal (b), to the first piezoelectric transducer 8 via the terminal 17b; and the control signal (c), to the second piezoelectric transducer 9 via the terminal 17c. The direction of the shift and the distance to be shifted are controlled in response to the control signals (d) and (e) which are derived from the focusing means. In the first embodiment, the focusing means receives an image focused through the lens group 2, detects whether the lens group is located forwardly or backwardly of and exactly at a focusing position; that is, the position in which the lens group 2 can sharply focus an object and generates the control signals, so that the lens group 2 is shifted to and held at the focusing position. When the control signal (d) is at a lower level, it represents that the lens group 2 is located backwardly of the focusing position , but when the control signal (d) is at a high level, it represents that the lens group 2 is located forwardly of the focusing position. When the control signal (e) is at a high level, it represents that the lens group 2 is brought to the focusing position.

More particularly, after the optical lens assembly has been mounted on the main body (not shown), the switch 23 is closed so as to activate the control circuit 24 which in turn generates the control signals or voltages (a), (b) and (c). First, it is assumed that the lens group 2 be located backwardly or behind of the focusing position. Then the control signal or voltage (d) is at a low level. The rises and falls of the control signals or voltages (a), (b) and (c) are timed as indicated by $t_0$ to $t_4$. That is, their phase relationship is such that when the control signal or voltage (a) rises, the control signal or voltage (b) is maintained at a high level while the control signal or voltage (c), at a low level and that when the control signal or voltage (b) is at a low level while the control signal or voltage (c) is at a high level, the control signal or voltage (a) rises.

For instance, when the switch 23 is closed at $t_0$, the control signal or voltage (b) is at a high level, so that the first transducer 8 is energized to distort itself in the direction of its thickness. As a result, the first sliding member 10 is caused to rise to engage with the inner cylindrical surface of the stationary cylinder 1, whereby the first ring 4 is held stationary. At $t_0$ both the control signals or voltages (a) and (c) are at a low level, so that the second ring 5 is not held by the stationary cylinder 1 and the collapsible couplings 12 remain stationary.

At $t_1$ when the control signal or voltage (a) rises while the control signal or voltage (b) is at a high level and the control signal or voltage (c) is at a low level, the third piezoelectric transducers 13 are energized and expanded. At this moment, the first ring 4 is held stationary and the second ring 5 is free, so that the second ring 5 is caused to move in the direction A over a distance equal to the distortions or expansions of the third piezoelectric transducers 13. As a result, the inner cylinder 3 and hence the lens group 2 are shifted in the direction A.

At $t_2$, the control signal or voltage (c) rises so that the second piezoelectric transducer 9 is energized to expand, so that the sliding member 11 is caused to rise to engage with the stationary cylinder 1, whereby the second ring 5 is held stationary.

At $t_3$, the control signal or voltage (b) drops so that the first piezoelectric transducer 8 is de-energized and consequently the first ring 4 is released from the stationary cylinder 1.

At $t_4$, the control signal or voltage (a) falls while the control signal or voltage (b) is maintained low and the control signal or voltage (c) is maintained high. Then, the third transducers 13 are de-energized and returned to its initial state. Since the first ring 4 is released while the second ring 5 is held stationary, the first ring 4 is caused to shift in the direction A over a distance equal to the discrepancy between the expanded and normal states of the piezoelectric transducers 13. Thus, one cycle of the shift to the direction A is completed.

At $t_5$ when the phase relationship among the control signals or voltages (a), (b) and (c) is same as $t_0$, the next cycle is started. Repeating the shift cycles, the lens group 2 is shifted step by step in the direction A.

At $t_6$, the lens group 2 reaches the focusing position, so that the control signal or voltage (e) rises and the control signal or voltage (a) is forced to be maintained at a low level by the control circuit 24. As a result, the third piezoelectric transducers 13 are kept de-energized, so that even when the first and second rings 4 and 5 are engaged with or released from the stationary cylinder 1, the lens group 2 remains at the focusing position.

Next, it is assumed that when the switch 23 is closed, the lens group 2 is located forwardly or in front of the focusing position. Then, the control signal or voltage (d) rises and is maintained at a high level and the phase relationship among the control signals or voltages (a), (b) and (c) is reversed. That is, at $t_1$ the control signal or voltage (c) is maintained at a high level and at $t_2$ the control signal or voltage (a) rises. At $t_3$ the control signal or voltage (b) rises. Therefore, at the start of the shift cycle, the second piezoelectric transducer 9 is energized and expanded, so that the second ring 5 is engaged with the stationary cylinder 1. When the control signal or voltage (a) rises, the third piezoelectric transducers 13 are energized and expanded. Since the first ring 4 is released from the outer cylinder 1, the expansions of the third transducers 13 cause the first ring 4 to move in the direction indicated by an arrow B in FIG. 1A. Thereafter, the control signal or voltage (b) rises, so that the first ring 4 is engaged with the stationary cylinder 1 and when the control signal or voltage (c) falls, the second ring 5 is released from the stationary or outer cylinder 1. Thereafter, the third piezoelectric transducers 13 are de-energized as the control signal or voltage (a) falls, so that the transducers 13 return to their initial states, so that the second ring 5 is caused to move in the direction B. Thus, one cycle of the backward shift of the lens group 2 is completed.

This cycle is repeated so that the lens group 2 is shifted backward step by step in the direction B. When the lens group 2 reaches the focusing position, the control signal or voltage (e) rises and the control signal or voltage (a) is kept at a low level as described previously, so that the lens group 2 remains at the focusing position regardless of the rises and falls of the control signals or voltages (b) and (c).

As described above, according to the present invention, the optical lens assembly is shifted and stopped by the application of control voltages to the piezoelectric transducers which in turn produces their mechanical distortions. Thus, the present invention provides a novel optical lens assembly which has, among other things, an advantage that it can be made very compact in size.

Figure 4:
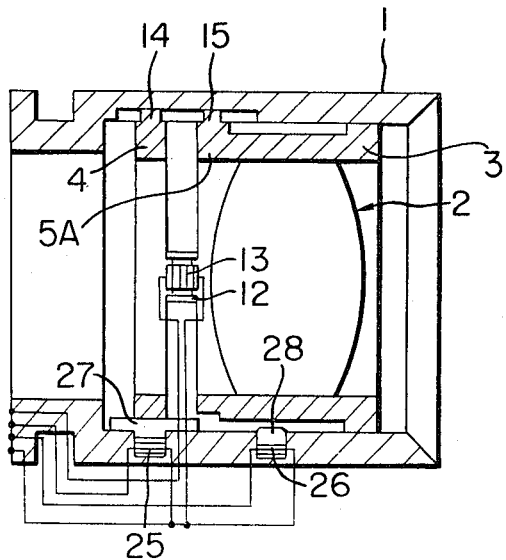
FIGS. 4 and 5 are sectional views of a second and a third embodiment, respectively, of the present invention.

In FIG. 4 is shown a second embodiment of the present invention. The second ring 5A is formed integral with the inner cylinder 3 in which is mounted the lens group 2 and first and second piezoelectric transducers 25 and 26 and their associated sliding members 27 and 28 are disposed on the stationary cylinder 1 so as to hold the inner cylinder 3 and the first ring 4 stationary in a manner substantially similar to that described above. The modes of the forward and backward shifts of the lens group 2 are substantially similar to those described above, so that no further explanation shall be made.

Figure 5:
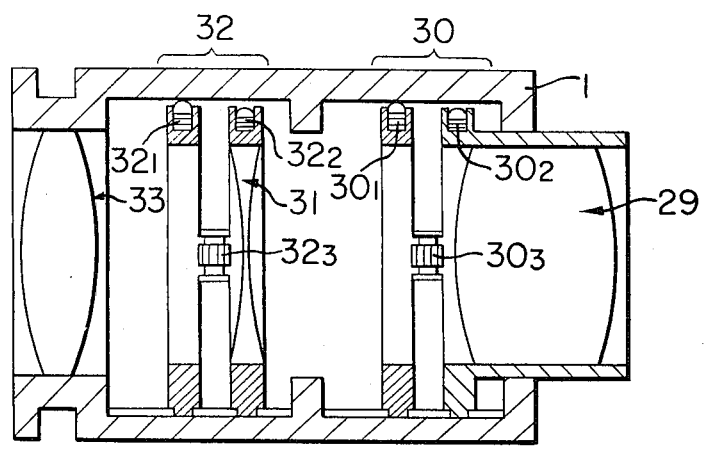

In FIG. 5 is shown a third embodiment of the present invention which is applied to a zoom lens. It has a focusing lens group 29 and a mechanism 30 for shifting and holding stationary the focus lens group 29. The shift-and-hold mechanism 30 comprises piezoelectric transducers $30_1$, $30_2$ and $30_3$ (which correspond to the first, second and third transducers 8, 9 and 13, respectively, in the first embodiment). The zoom lens further includes a variator lens group 31 and its shift-and-hold mechanism 32 comprising piezoelectric transducers $32_1$, $32_2$ and $32_3$ (which correspond to the first, second and third transducers 8, 9 and 13, respectively, of the first embodiment). The zoom lens further includes a stationary lens 33 and terminals and lead wires (not shown) associated with the piezoelectric transducers.

An object is focused by shifting the focusing lens group 29 and the zooming is attained by shifting the variator lens group 31. The modes of the shifts of the lens groups 29 and 31 are substantially similar to that described in the first embodiment so that no further explanation shall be made.

In the third embodiment, the control signal or voltage (d) as shown in FIG. 3 may be used for controlling the magnification. That is, in response to the control signal or voltage at a low level, the variator lens group 31 is shifted in the direction in which the magnification is reduced while in response to the control signal or voltage at a high level, the variator lens group 31 is shifted in the direction in which the magnification is increased. The low or high control signal or voltage may be selected by an operator.

What is claimed is:

1. A lens shifting device characterized by comprising
    a stationary cylinder having a mounting means adapted to engage with a mating means of a main body of an equipment which uses an optical lens assembly which must be shifted for focusing,
    an inner cylinder which is slidably fitted into said stationary cylinder and in which is securely mounted a lens group,
    contact members made into slidable contact with the inner cylindrical surface of said stationary cylinder, one of which being interconnected with said inner cylinder coaxially,
    locking means adapted to cause said contact members to lock to said stationary cylinder, and
    expandable-and-collapsible means interconnecting between said contact members,
    whereby said inner cylinder is caused to slide step by step relative to said stationary cylinder in the axial direction thereof and forwardly or backwardly by activating said locking means and said expandable-and-collapsible means by desired timing relationship.

2. A lens shifting device as set forth in claim 1 further characterized in that
    each of said locking means includes a driving means comprising a piezoelectric or electrostrictive transducer which, when applied with an electrical signal, produces mechanical distortions.

3. A lens shifting device as set forth in claim 1 further characterized in that
    said expandable-and-collapsible means includes a driving means comprising a piezoelectric transducer which, when applied with an electrical signal, produces mechanical distortions.

4. A lens shifting device as set forth in claim 1 further characterized in that
    each of said locking means includes a driving means comprising a piezoelectric transducer and a sliding engaging member which is driven by said driving means so as to engage with the inner cylindrical surface of said stationary cylinder, thereby holding the associated contact member stationary relative to said stationary cylinder.

5. A lens shifting device as set forth in claim 1 further characterized in that
    said locking means are disposed on the stationary cylinder or barrel and each has a driving means comprising a piezoelectric transducer and a sliding engaging member which is driven by said driving means to engage with the outer cylindrical surface of said inner cylinder, thereby holding the same stationary relative to said stationary cylinder.

6. A lens shifting device as set forth in claim 1 further characterized in that
    control signals which are applied to said locking means and said expandable-and-collapsible means so as to cause the stepwise shift of said inner cylinder are supplied from a focusing means.

7. A lens shifting device as set forth in claim 6 further characterized in that said control signals are supplied from said main body of said equipment via said mounting means of said stationary cylinder.

8. A lens shifting device as set forth in claim 1 further characterized in that
said optical lens assembly is a zoom lens system whose focusing lens group and variator lens group are securely mounted in first and second inner cylinders, respectively, and
said first and second inner cylinders are provided with said contact members, said locking means and said expandable-and-collapsible means.

9. An arrangement utilizing electrostrictive or piezoelectric transducers to shift the lens of a camera to provide electromechanical focusing thereof, comprising:
a stationary cylinder;
an inner cylinder coaxial with and mounted for telescoping sliding movement within said stationary cylinder;
a first annular ring slidably mounted within said stationary cylinder;
a second annular ring slidably mounted within said stationary cylinder adjacent said first annular ring, said second annular ring being secured to said inner cylinder;
a lens, to be moved to focus said camera, disposed within and secured to said inner cylinder;
resilient means interconnecting said annular rings;
first electrostrictive or piezoelectric transducer means for selectively pressing the first annular ring against said stationary cylinder to selectively lock said first annular ring in position;
second electrostrictive or piezoelectric transducer means for selectively pressing the second annular ring against said stationary cylinder to selectively lock said second annular ring in position;
third electrostrictive or piezoelectric means connected between said annular rings for selectively pushing said annular rings away from each other; and
control means for causing said annular rings to move within said stationary cylinder in stepwise fashion by sequentially and repetitively (i) activating said first means to lock one of said annular rings in position, (ii) actuating said third means to push the other of said annular rings away from said one annular ring, (iii) actuating said second means to lock said other annular ring in position, and (iv) de-activating said first and third means to permit said resilient means to draw said one annular ring toward said other annular ring.

10. The arrangement according to claim 9, wherein said second annular ring is integral with said inner cylinder.

11. An arrangement utilizing electrostrictive or piezoelectric transducers to shift a lens, comprising:
a cylinder;
a first locking member slidably mounted within said cylinder;
a second locking member slidably mounted within said cylinder adjacent said first member;
a lens to be moved to focus said camera;
means for coupling said lens to one of said locking members so that said lens moves in response to the movement thereof;
resilient means interconnecting said locking members; first electrostrictive or piezoelectric transducer means for selectively engaging the first locking member with said cylinder to selectively lock said first locking member in position;
second electrostrictive or piezoelectric transducer means for selectively engaging the second locking member with said cylinder to selectively lock said second locking member in position;
third electrostrictive or piezoelectric means interconnected between said locking members for selectively moving said locking members with respect to each other; and
control means for causing said locking members to move within said cylinder in stepwise fashion by sequentially and repetitively (i) actuating said first means to lock one of said locking members in position, (ii) actuating said third means to move the other of said locking members with respect to said one locking member, (iii) actuating said second means to lock said other locking member in position, and (iv) deactivating said first and third means to permit said resilient means to draw said one locking member toward said other locking member.

* * * * *